US012525828B2

(12) United States Patent
Klemm et al.

(10) Patent No.: US 12,525,828 B2
(45) Date of Patent: Jan. 13, 2026

(54) CHARGER

(71) Applicant: Braun GmbH, Kronberg (DE)

(72) Inventors: Torsten Klemm, Eschborn (DE); Manal Ali, Frankfurt (DE)

(73) Assignee: Braun GmbH, Kronberg (DE)

(*) Notice: Subject to any disclaimer, the term of this patent is extended or adjusted under 35 U.S.C. 154(b) by 731 days.

(21) Appl. No.: 17/890,433

(22) Filed: Aug. 18, 2022

(65) Prior Publication Data

US 2023/0060431 A1 Mar. 2, 2023

(30) Foreign Application Priority Data

Aug. 24, 2021 (EP) .................... 21192832

(51) Int. Cl.
*H02J 7/00* (2006.01)
*H02J 50/90* (2016.01)
*H02J 50/10* (2016.01)

(52) U.S. Cl.
CPC ............ *H02J 50/90* (2016.02); *H02J 7/0044* (2013.01); *H02J 50/10* (2016.02)

(58) Field of Classification Search
CPC ................ A61C 17/224; A61C 17/005; A61C 2204/002; H02J 50/10; H02J 50/12;
(Continued)

(56) References Cited

U.S. PATENT DOCUMENTS 5,864,288 A 1/1999 Hogan
D548,179 S 8/2007 Vu
(Continued)

FOREIGN PATENT DOCUMENTS

CN 112294481 A 2/2021
GB 2519579 A 4/2015
(Continued)

OTHER PUBLICATIONS

"Electric Toothbrush Replacement Charger for Braun Oral-B Electric Toothbrush, Inductive Charging Base Portable Oral-B Waterproof Power Cord Environmental ABS, Model 3757 by Lap Pow (White)", Amazon, URL: https://www.amazon.com/dp/BO7MDJRWZQ, first available on May 23, 2007, 10 pages.
(Continued)

*Primary Examiner* — Zixuan Zhou
(74) *Attorney, Agent, or Firm* — Jay A. Krebs

(57) ABSTRACT

A charger for charging a rechargeable energy source of a personal care device has a housing having a charging region for positioning the personal care device, a circuit for performing a charging procedure of the rechargeable energy source of the personal care device, a motion sensor for detecting a motion of at least a portion of the charger, preferably wherein the charger comprises a motion enhancer, a controller coupled with the charging circuit and the motion sensor. The controller is arranged to activate the charging circuit when the controller receives a motion signal from the motion sensor indicating a placement of the personal care device in the charging region and/or to deactivate the charging circuit when the controller receives a motion signal from the motion sensor indicating a removal of the personal care device from the charging region.

22 Claims, 2 Drawing Sheets

(58) Field of Classification Search
CPC ........ H02J 50/90; H02J 50/005; H02J 7/0044; H02J 7/342
USPC .......................................... 320/108; 307/104
See application file for complete search history.

(56) References Cited

U.S. PATENT DOCUMENTS

| | | | |
|---|---|---|---|
| D661,930 S | 6/2012 | Gebski | |
| D682,198 S | 5/2013 | Vu | |
| 8,533,892 B2 | 9/2013 | Dabrowski | |
| D694,182 S | 11/2013 | Lee et al. | |
| D718,236 S | 11/2014 | Murray | |
| D757,014 S | 5/2016 | Hahn et al. | |
| D768,570 S | 10/2016 | Shigeno et al. | |
| D768,571 S | 10/2016 | Shigeno et al. | |
| D772,813 S | 11/2016 | Wahl | |
| D774,455 S | 12/2016 | Kim et al. | |
| D784,259 S | 4/2017 | Huang et al. | |
| D786,193 S | 5/2017 | Akana et al. | |
| D789,373 S | 6/2017 | King | |
| D794,557 S | 8/2017 | Kim | |
| D795,182 S | 8/2017 | Akana et al. | |
| D797,042 S | 9/2017 | Miller et al. | |
| D798,808 S | 10/2017 | Ptok et al. | |
| D810,015 S | 2/2018 | Carreon et al. | |
| D810,680 S | 2/2018 | Carreon et al. | |
| D837,148 S | 1/2019 | Brown | |
| D839,189 S | 1/2019 | Miller et al. | |
| D850,367 S | 6/2019 | Xiong et al. | |
| D850,372 S | 6/2019 | Kong et al. | |
| D866,459 S | 11/2019 | Huang | |
| D870,663 S | 12/2019 | Schubert et al. | |
| D870,664 S | 12/2019 | Langhammer | |
| D870,665 S | 12/2019 | Schubert et al. | |
| D872,015 S | 1/2020 | Choi et al. | |
| D875,678 S | 2/2020 | Kim et al. | |
| D884,624 S | 5/2020 | Lei | |
| D886,052 S | 6/2020 | Albay et al. | |
| D901,379 S | 11/2020 | Choi et al. | |
| D913,222 S | 3/2021 | Albay et al. | |
| D917,390 S | 4/2021 | Tung | |
| D918,135 S | 5/2021 | Akana et al. | |
| 11,025,093 B2 | 6/2021 | Schaefer et al. | |
| D931,860 S | 9/2021 | Chin | |
| D935,395 S | 11/2021 | Chen et al. | |
| D935,448 S | 11/2021 | Lee | |
| D937,204 S | 11/2021 | Okai et al. | |
| D937,205 S | 11/2021 | Okai et al. | |
| D945,364 S | 3/2022 | Chang et al. | |
| D967,014 S | 10/2022 | Langhammer et al. | |
| D967,015 S | 10/2022 | Langhammer et al. | |
| D975,010 S | 1/2023 | Tung | |
| D977,424 S | 2/2023 | Wang | |
| D978,074 S | 2/2023 | Kiveläet al. | |
| D986,822 S | 5/2023 | Wu | |
| 11,755,686 B2 | 9/2023 | Sherman | |
| D1,006,739 S | 12/2023 | Li | |
| D1,019,556 S | 3/2024 | Wang | |
| D1,021,774 S | 4/2024 | Bennett et al. | |
| D1,025,899 S | 5/2024 | Bressan | |
| D1,030,651 S | 6/2024 | Akana et al. | |
| D1,039,493 S | 8/2024 | Liu | |
| D1,055,847 S | 12/2024 | Shen | |
| 2006/0176017 A1 | 8/2006 | Waguespack | |
| 2010/0289448 A1 | 11/2010 | Jung et al. | |
| 2013/0193915 A1 | 8/2013 | Jung et al. | |
| 2017/0110911 A1 | 4/2017 | Bossetti et al. | |
| 2018/0062414 A1* | 3/2018 | Chiu | H02J 7/342 |
| 2019/0200746 A1 | 7/2019 | Serval et al. | |
| 2020/0268141 A1 | 8/2020 | Newman et al. | |
| 2020/0397546 A1 | 12/2020 | Miller et al. | |
| 2023/0045594 A1 | 2/2023 | Newman et al. | |
| 2023/0216341 A1* | 7/2023 | Alam | H01Q 1/36 |
| | | | 307/104 |
| 2023/0301408 A1 | 9/2023 | Chawan et al. | |
| 2023/0342423 A1 | 10/2023 | Sherman et al. | |

FOREIGN PATENT DOCUMENTS

| | | |
|---|---|---|
| JP | H05161508 A | 6/1993 |
| WO | 2010129755 A1 | 11/2010 |

OTHER PUBLICATIONS

"Replacement Electric Toothbrush Charger Fit for Oral B, Inductive Charger Base Compatible with Braun Electric Toothbrush, Portable Environmental ABS Fit for Oral B Electric Toothbrush", Amazon, URL: https://www.amazon.com/dp/B0B3CSKMGV, first available on Jul. 14, 2018, 10 pages.

All Office Actions; U.S. Appl. No. 17/880,856, filed Aug. 4, 2022.

All Office Actions; U.S. Appl. No. 17/880,869, filed Aug. 4, 2022.

Extended EP Search Report and Written Opinion for 21192832.0 dated May 6, 2022, 11 pages.

PCT Search Report and Written Opinion for PCT/IB2022/057273 dated Jan. 3, 2023, 13 pages.

Unpublished U.S. Appl. No. 17/880,856, filed Aug. 4, 2022, to Matthew Lloyd Newman.

Unpublished U.S. Appl. No. 17/880,869, filed Aug. 4, 2022, to Matthew Lloyd Newman.

* cited by examiner

CHARGER

FIELD OF THE INVENTION

The present disclosure is concerned with a charger for preferably wireless charging of a rechargeable energy source of preferably a personal care device and is concerned with a system comprising such a charger and a personal care device having a rechargeable energy source.

BACKGROUND OF THE INVENTION

It is generally known that a rechargeable energy source of a device such as a personal care device can be charged by a charger and that such a charger can transfer energy in a wireless manner, e.g., in an inductive or resonant inductive manner. It is further known that such a charger shall preferably only transfer energy in case a rechargeable energy source is placed on the charger and requires charging. The charger can be arranged to switch off the energy transfer if the rechargeable energy source is fully charged, i.e., the charger has a stand-by mode in which the charger consumes less energy than in a charging mode.

Document EP 0 357 829 A1 describes a non-contacting power supplying system comprising a power supplying apparatus and a power receiving apparatus. The system comprises position detector means to detect when said power receiving apparatus is at a predetermined relative position and/or charge level detector means to detect a level at which a chargeable source of the power receiving apparatus has been charged. Power supply from the power supplying apparatus to the power receiving apparatus is controlled by the position and/or charge level control means.

There is a general object to improve known chargers or systems comprising a charger and a device to be charged such as a personal care device, preferably such that the charger can become essentially independent from a mains connection and can operate with an on-board energy source for some extended period of time.

SUMMARY OF THE INVENTION

In accordance with at least one aspect, a charger for charging a rechargeable energy source of a personal care device is provided, the charger comprising a charger housing having a charging region for positioning the personal care device, a charging circuit for performing a charging procedure of the rechargeable energy source of the personal care device, a motion sensor for detecting a motion of at least a portion of the charger, preferably wherein the charger comprises a motion enhancer, a controller coupled with the charging circuit and the motion sensor, wherein the controller is arranged to activate the charging circuit when the controller receives a motion signal from the motion sensor indicating a placement of the personal care device in the charging region and/or to deactivate the charging circuit when the controller receives a motion signal from the motion sensor indicating a removal of the personal care device from the charging region.

In accordance with at least one aspect, a system is provided that comprises a charger as discussed herein and a personal care device having a rechargeable energy storage arranged for being chargeable by the charger when the personal hygiene device is positioned in the charging region of the charger.

In accordance with at least one aspect, a charger for charging a rechargeable energy source of a personal care device is provided, the charger having a charging circuit and a controller for automatically switching the charging circuit into a stand-by mode or for activating the charging circuit, wherein the energy consumption of the charger in the stand-by mode is less than about 5 mW, preferably less than about 2 mW, more preferably less than about 1 mW, even more preferably less than about 0.5 W and yet even more preferably less than about 0.2 mW and in particular of about 0.1 mW, where preferably the charger comprises an internal energy source for providing the energy for at least one charging procedure and further preferably wherein the charger comprises a motion sensor coupled with the controller and the controller is arranged to activate the charging circuit based on a signal provided by the motion sensor to the controller.

BRIEF DESCRIPTION OF THE DRAWINGS

The present disclosure will be further elucidated by a detailed description of example embodiments and with reference to figures.

DETAILED DESCRIPTION OF THE INVENTION

Figure 1A:
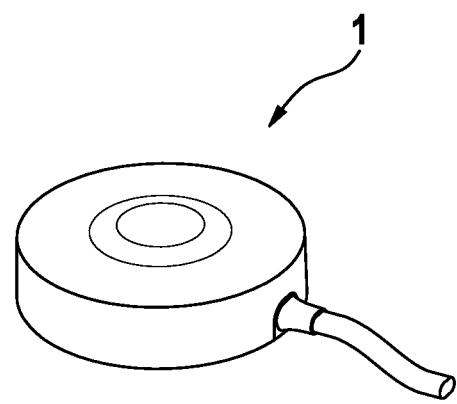
FIG. 1A is a schematic depiction of a charger.

In the context of the present description "personal care" shall mean the nurture (or care) of the skin and of its adnexa (i.e., hairs and nails) and of the teeth and the oral cavity (including the tongue, the gums etc.), where the aim is on the one hand the prevention of illnesses and the maintenance and strengthening of health and on the other hand the cosmetic treatment and improvement of the appearance of the skin and its adnexa. It shall include the maintenance and strengthening of wellbeing. This includes skin care, hair care, and oral care as well as nail care. This further includes grooming activities such as beard care, shaving, and depilation. A "personal care device" thus means any device for performing such nurturing or grooming activity, e.g. (cosmetic) skin treatment devices such as skin massage devices or skin brushes; wet razors; electric shavers or trimmers; electric epilators; and oral care devices such as manual or electric toothbrushes, (electric) flossers, (electric) irrigators, (electric) tongue cleaners, or (electric) gum massagers. This shall not exclude that the proposed personal care device may have a more pronounced benefit in one or several of these nurturing or device areas than in one or several other of these areas. In the present description, an electric toothbrush was chosen to represent a personal care device. To the extent in which the details are not specific for an electric toothbrush, the proposed technology can be used in any other personal care device.

A charger in accordance with the present disclosure comprises a motion sensor, a controller, and a charging circuit for charging a rechargeable energy source of a device, preferably a personal care device, when the device is placed into a charging region of the charger. The charging circuit may comprise exactly one charging coil for inductive energy transfer and exactly one charging region for receiving the device to be charged. In accordance with one aspect proposed in the present disclosure, the charging circuit is activated when a placement of the device is determined based on a motion signal or motion signals provided by the motion sensor.

The motion signal may be a simple "high" signal that is provided if the motion sensor experiences a motion above a certain threshold. The motion signal may also depend on the strength or amplitude of the motion. The motion signal may comprise two or more components for motions in different directions. A motion may be an acceleration like a linear acceleration or an angular rate. In addition, the charger may be arranged to automatically activate the charging circuit in regular or irregular intervals such as once a day to check whether a device is placed into the charging region, which device requires charging. Even if a fully charged device is put into the charging region, it may require again charging after some time due to energy leaking out of the energy source of the device. Such regular or irregular activation of the charging circuit may also overcome the issue that a previous placement of the device on the charger was not correctly determined.

In accordance with some aspects, the charger may comprise an internal energy source that provides the energy for at least one at least partial charging of the rechargeable energy source of the device. This internal "power bank" can make the charger independent from a mains connection for an extended time, e.g., for a week or several weeks, a month or several months. To save energy, a low or even ultra-low power consumption design during the stand-by mode may be implemented—where a detailed example is provided below.

The low power consumption design may be based on switching off all unneeded energy consuming components while the charger is not charging, i.e., when the charger is in stand-by mode, and to use only a low power consuming unit to provide a wake-up signal such as an interrupt, where the low energy consuming element may be a motion sensor—in case of a mechanical vibration switch realizing the motion sensor, the mechanical vibration switch may not consume any energy until a vibration above a threshold closes the switch.

While it is known that a charger that is designed to immediately respond to the presence of a device to be charged may require a stand-by power of about 100 mW, the low power consumption concept as presented below may reduce such stand-by power consumption by a factor of up to 1000, which means that the charger drains only a very small amount of energy from the internal energy source while it is in stand-by mode and may be able to still charge a device even in case the charger was not itself recharged a long period of time ago, e.g. one month ago or two month ago. Such a charger that is for a long time independent from mains connection or any other form of recharging, serves a need of, e.g., users that travel regularly and that want to be independent from local adaptors etc.

A charger in accordance with the present disclosure comprises a motion sensor that is arranged to measure the motion (typically a motion in the form of an acceleration) of at least a portion of the charger, preferably wherein the portion of the charger comprises the charging region. A motion sensor may be realized by at least one of a one-axis or two-axis or three-axis accelerometer, a one-axis or two-axis or three-axis gyroscope or a one-axis or two-axis or three-axis magnetometer.

Combined motion sensors having 6 axes or even 9 axes are contemplated and are available as system-in-package. Such a motion sensor may be realized as a micro-electric-mechanical system (MEMS). While the examples of a motion sensor mainly discussed herein relate to (miniaturized) inertial measurement units (IMU), it shall not be excluded that other realizations of a motion sensor are considered as well, e.g., electrooptic sensors to measure a change in position between at least a portion of the charger relative to another portion of the charger or relative to the ground on which the charger stands etc. or capacitive sensors or inductive sensors etc. Also, a barometer, preferably a MEMS barometer, may be considered as motion sensor.

Further, a mechanical vibration switch may be used, preferably an SMD mountable vibration switch. As one example, the omni-directional vibration detector CSX-SEN-180A from Shenzhen ChengShengXing Technology Co., Ltd., Guangdong, China, may be used. Such a vibration switch may be designed to be closed at rest and to open when a vibration shock is experienced. Often such vibration switches use a ball-like element that closes and opens the switch. As such a vibration switch may not reliably close again at rest, the controller may be arranged to detect changes in the switch state rather than to monitor whether the switch is open or closed. Such a vibration switch does not generate a vibration amplitude-dependent motion signal but generates a change in the closed or open state(s) of the switch if a vibration of a certain minimal amplitude is experienced—a change in a high or low signal input at the controller. Such a signal does not need to be compared with a threshold value.

The motion sensor is used to determine a typically small motion such as a vibration or small displacement of at least a portion of the charger when a user places a personal care device to be charged into the charging region of the charger. The user will typically cause some vibration or small displacement of the charger in the process of placing the personal care device into the charging region.

As will be explained in more detail further below, the charger and potentially also the personal care device may comprise a structure to enhance the motion caused by the placement of the personal care device in the charger region so that the placement of the personal care device on the charger can be better differentiated from a vibration of the charger caused, e.g., by a vibration of the ground on which the charger is placed. Such structure to enhance the motion is referred to herein as a motion enhancer. Various examples of motion enhancers will be discussed in more detail further below.

A motion signal or a sequence of a plurality of temporally spaced motion signals provided by the motion sensor may then be fed into a controller, which controller may be arranged to activate a charging circuit of the charger in case the motion signal or the sequence of motion signals indicate a placement of a personal care device on the charger. The activation of the charging circuit may preferably not start any charging procedure as such.

The charger circuit may be arranged to first check whether indeed a device such as a personal care device having a rechargeable energy source is placed into the charging region of the charger and preferably the charging circuit may be arranged to check not only if such a device is present but also whether the rechargeable energy source indeed requires charging, i.e., is at least partly depleted. Only in case a device with a rechargeable energy source that requires charging is placed on the charging region the charging circuit starts a charging procedure.

In case that no device is present in the charging region (as, e.g., the device was removed and has triggered the motion sensor signal or the ground on which the charger stands was vibrating) or a device with a rechargeable energy source is present but the rechargeable energy source is completely charged and requires no charging, the charging circuit is again deactivated and completely switched off so that it consumes no energy. The controller may then also switch itself into a sleep mode in which only a portion of the controller monitoring the motion signal may be still active. The same happens in case a charging procedure is completed. A charging circuit that may be contemplated is discussed in document U.S. Pat. No. 10,218,212 B2, which document is included herein by reference.

Specifically, for a charger that shall have an as low as possible energy consumption in the stand-by mode when no charging occurs in order to not drain a built-in energy storage, the motion sensor may be used in a low power consumption mode. As will be explained, a current consumption of below 10 microamperes is possible. The controller portion monitoring the motion signal from the motion sensor can then be used to create a wake-up signal when a significant motion is detected to switch the sleeping portion of the controller into an active state so that the controller can activate the charging circuit which then starts the procedure as described.

In one non-limiting example, an internal power bank of the charger, i.e., an internal energy source, has a 6.800 mAh battery and a typical personal care device may require a charge amount of 700 mAh (at an efficiency of power transfer between charger and rechargeable energy source of the personal care device of typically below 50%). The power bank may then be sufficient for three to four complete charging events.

As one example of a low power consumption design, it is referred to the LSM6DSO inertial module from STMicroelectronics N.V., Amsterdam, The Netherlands. The LSM6DSO is a system-in-package that has a 3-axis (3D) digital accelerometer and a 3-axis (3D) digital gyroscope. The LSM6DSO was configured in ultra-low-power mode, in which the gyroscope is configured in power-down mode (see section 6.2.1 of the data sheet available from STMicroelectronics). The LSM6DSO was set to an output data rate (ODR) of 12.5 Hz and the full scale to +/−2 g. These settings led to a current consumption of only 5.5 microamperes, which is to be compared with the current consumption of 0.55 mA of the LSM6DSO in combo high-performance mode.

The wakeup interrupt was enabled and a threshold value and a duration for which the accelerometer signal must be above the threshold were set to determine which motion signal qualifies as a valid motion signal causing an interrupt. The LSM6DSO was connected with a microcontroller (realizing a portion of the controller of the charger) and the microcontroller was arranged so that the interrupt signal woke up the microcontroller from a sleep mode in which the microcontroller did not consume any energy.

A charger in accordance with the present description comprises a "controller" that is coupled with the motion sensor and with the charging circuit. It shall be understood that the term controller does not necessarily refer to a single unit such as a packaged microcontroller but that the controller may comprise spatially separate sub-controller units. In some embodiments, the motion sensor is a part of a system-in-package as in the example above that may include further components like a signal processor for creation of event detection interrupts, a memory for data batching like a FIFO, a temperature sensor etc.

The term "controller" may then encompass parts of the system-in-package and, e.g., a separate microcontroller. In such a controller set-up, the microcontroller may be completely in sleep mode when the charger is in stand-by mode, and the controller portion realized by the system-in-package provides the wake-up signal as an interrupt that activates the microcontroller.

In accordance with some aspects, whether or not in combination with the above-described low power consumption design, the controller may be arranged to automatically wake up in regular or irregular intervals, e.g., once a day or twice a day or every hour or every minute or 24 times per day or 1.440 times per day etc. As a rechargeable energy source of a personal care device typically leaks energy even when not in use but when standing on the charging region of the charger, the charger may take care of a regular recharging of the leaking rechargeable energy source of the personal care device independent from whether a motion signal causes activation of the charging circuit. This may also avoid the situation that the positioning of the personal care device on the charger does for whatever reason not trigger the controller to activate the charging circuit.

Overall, the charger comprising the above-described ultra-low power design using the LSM6DSO had a power consumption of 0.1 mW in the stand-by or sleep modus (automatic activation of charging circuit once a day). This is to be compared with a more usual 100 mW power consumption of a previous charger design.

While some emphasis is here put onto a low power design that has particular value for a charger with in-built power supply (e.g. internal power-bank realized by an energy source that may have a capacity of at least 1.500 mAh, preferably at least 5.000 mAh to enable at least partial charging of a rechargeable energy source of a personal care device independent from a mains connection), this shall not exclude that the motion sensor is, e.g., driven at a higher output data rate in order to create time sequences of motion data of in particular a plurality of axes.

A motion sensor positioned in the charger, e.g., being secured at a housing of the charger or at a support such as a PCB that itself is fixedly connected with at least a portion of the housing of the charger that comprises the charging region can determine a motion signal induced by the placement of a device into the charging region. The motion sensor provides a motion signal that may be compared by the controller with an absolute motion signal threshold, or the motion sensor may provide a temporal sequence of motion sensor data that may be compared with a predetermined characteristic temporal motion signal sequence.

The motion sensor may be sampled at a high frequency to allow determining a characteristic temporal behavior of the motion signals associated with a placement of a device into the charging region, e.g., the sampling frequency may be in a range of between 100 Hz and 10 kHz, preferably in a range of between 150 Hz and 2 kHz. A temporal sequence of motion signals, whether the motion signal is created by a one axis IMU, a two-axis IMU, a three-axis IMU or even up to a nine-axis IMU, can be analyzed by regular statistical analysis. This may involve comparing the motion signal sequence with a predetermined reference motion signal sequence and, e.g., computing an absolute difference between the two sequences and classifying the current motion signal sequence as being characteristic for a device placement event or not.

A time sequence of motion signals may also be classified by a machine learning algorithm, e.g., by a trained recurrent neural network, to classify whether the motion signal sequence is characteristic for the placement of a personal care device on the charging region or not. In case of a mechanical vibration switch, the switch may be calibrated to only create a motion signal if the vibration had a certain magnitude and thus closes the switch. A comparison with a reference signal is then not needed.

In accordance with some aspects, a charger as proposed herein has at least one motion enhancing feature or structure, referred to herein as a motion enhancer. The motion enhancer is intended to boost the magnitude of the motion of at least a portion of the charger when the personal care device is positioned in the charging region. This may enable a better detection of a placement of a personal care device into the charging region. Four examples are provided in the following. It shall be understood that more than one of such described motion enhancers may be realized on the charger or by the system comprising charger and personal care device.

In a first example, the motion enhancer is a magnet, preferably a permanent magnet, that causes a magnetic force between the charger and the personal care device in case the personal care device also comprises a magnet, preferably a permanent magnet, or a magnetizable element such as a steel element. The magnet of the charger is preferably provided in the charging region (e.g., mounted at an inner surface of the housing) or in close proximity to the charging region so that the magnetic attraction between the magnet in the charger and the magnet or the magnetizable element in the personal care device becomes as high as possible.

Preferably, during the process of positioning the personal care device in the charging region, the magnetic interaction may cause the personal care device to magnetically snap onto the charger. In such a magnetic snapping action, the charger may be slighted lifted off the ground and the personal care device may be pulled towards the charger so that overall a characteristic motion of the charger is induced (such as upwards, opposite to the direction of earth's gravitational field), which motion also has a certain amplitude.

In a second example, the motion enhancer is at least one compressible or elastic, i.e., deformable element allowing at least a portion of the charger comprising the charging region to move in a device placement event. E.g., one foot or a plurality of feet with which the charger stands on the ground may be made from a foam rubber, e.g., a polyurethane foam rubber. Instead of a compressible foam, the foot or feet may be made from a soft elastomeric material, e.g., a silicone material that can easily deform when a device is placed in the charging region. This allows that the charger is pushed downwards by the weight of the personal care device and/or by the force with which the user puts the personal care device into the charging region as the rubber foam is compressed or the soft element is deformed or both.

In contrast to a charger that has essentially a solid base with which it stands on the ground where hardly any motion is induced at all, at least not towards the ground, the charger having a compressible and/or soft foot or feet is movable in this direction. In some embodiments at least the charging region is coupled to the rest of the charger by an elastic and/or compressible material so that at least the housing portion realizing the charging region can move relative to the rest of the housing of the charger. The motion sensor is then to be fixedly coupled with the housing portion realizing the charging region. For sake of clarity, the motion does not need to be large, but some micrometer or some tenth of micrometer may suffice, which holds as a general remark.

In a third example, the motion enhancer is non-planar structure of the housing of the charger in the charging region. This non-planar structure may be a projection that causes the housing of the charger or at least the housing portion realizing the charging region to wobble when the personal care device is placed on the charging region. The non-planar structure may be in particular a projection, i.e., a convex structure, or a recess, i.e., a concave structure, that is intended to cooperate with respective opposite recess or projection, respectively, of the device to be charged.

While such a structure may also be used to align a power transmitting coil of the charging circuit with a power receiving coil of the device to be charged, the mechanically engaging housing structures may lead to increased vibrations and/or displacement of the charger versus a mere planar charging region as the user may typically bump the engaging structures against each other, thereby causing the wishful vibration (s) and/or displacement(s) of the charger. The non-planar housing structure in the charging region and/or on the personal care device may in particular comprise a sub-structure such as one or a plurality of small projections that increase the possibility of the occurrence of mechanical charger-device interactions and thus enhance the possibility of vibrations or displacements during the placement process.

In a fourth example, the motion enhancer is a surface property of at least a portion of the housing surface in the charging region. E.g., the surface property may be chosen to support a stick-slip effect with a typical device surface. In a placement procedure, the device surface may then get shortly stuck on the surface having said surface property and may eventually slip away when the user tries to overcome the sticking, thus causing vibration(s) or displacement(s) of the charger. From a charger perspective, the surface property may be chosen to cause the stick-slip effect with a typical device surface, e.g., a polypropylene surface.

The surface property may be caused by a coating with a rubber-like material as such a material will cause a high static friction with a number of plastic materials typical for a housing of, e.g., a personal care device. From a system point of view, the surface properties of the charger in at least a portion of the charging region and of the cooperating surface of the personal care device to be charged may both be chosen such that the stick-slip phenomenon may occur in the device placement process.

FIG. 1A is a schematic depiction of a charger 1.

Figure 1B:
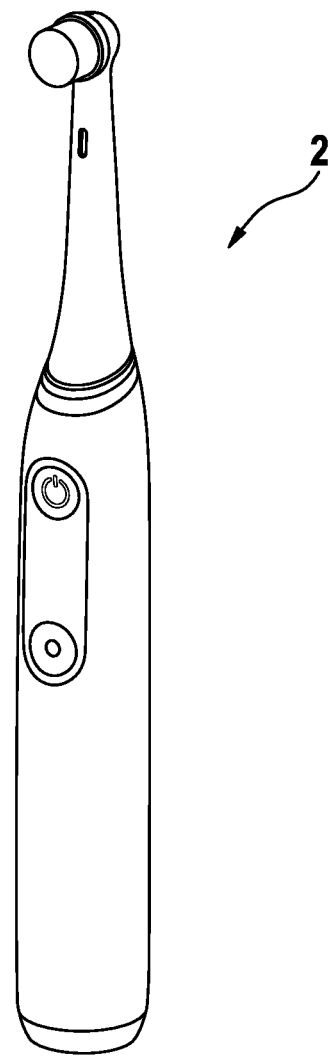
FIG. 1B is a schematic depiction of a personal care device.

FIG. 1B is a schematic depiction of a personal care device 2 realized as an electric toothbrush.

Figure 2:
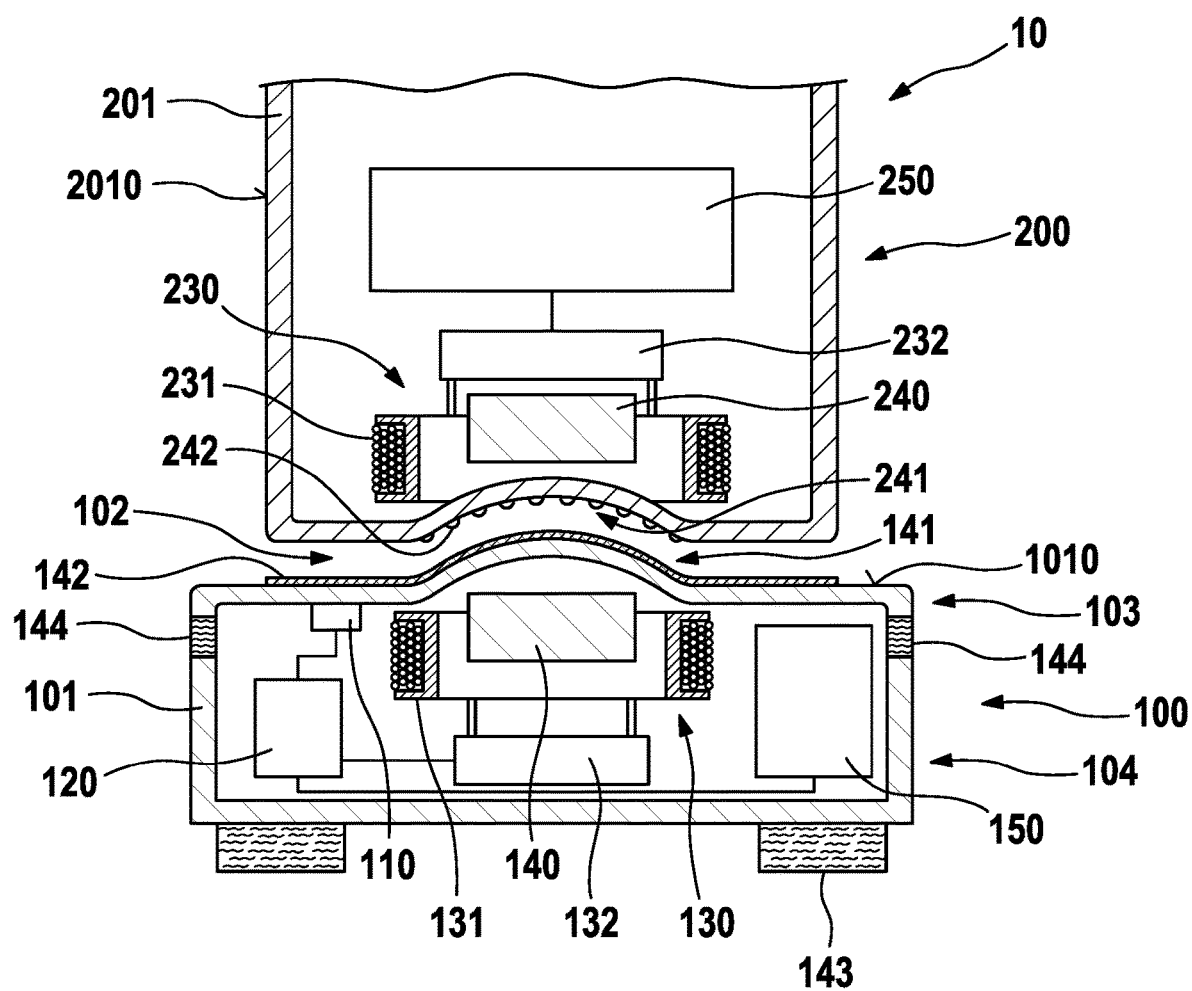
FIG. 2 is a cross section through a charger and a bottom portion of a device having a rechargeable energy source to be charged, the charger and the device forming a system.

FIG. 2 is a schematic cross-section through a charger 100 and a lower portion of a personal care device 200 that together form a system 10. The charger 100 comprises a housing 101 having an outer housing surface 1010, the housing 101 realizing a charging region 102 for placement of the personal care device 200 to be charged.

In the schematic depiction shown in FIG. 2, a motion sensor 110 is secured at an inner surface of the housing 101 of the charger 100 but it shall be understood that the motion sensor 110 may be mounted anywhere as long as it will experience the vibration or displacement of the charger 100 or of at least a portion of the charger that may occur due to the placement of the personal care device 200 in the charging region 102. E.g., the motion sensor 110 may be mounted on a support such as PCB secured at the housing 101 so that vibrations or displacements of the housing 101 are likewise experienced by the support and the motion sensor 110 mounted thereon.

The charger 100 comprises a controller 120 and a charging circuit 130 and may comprise an internal energy source 150 such as a battery or rechargeable battery that may provide a power bank function so that the charger 100 can provide its intended function of charging a rechargeable energy source of a personal care device even without a mains connection. The latter shall of course not exclude that a charger in accordance with the present disclosure has only a mains connection or only has an internal energy source. The charging circuit 130 may be arranged for wireless energy transfer, preferably by inductive coupling or resonant inductive coupling and may comprise a transmitter coil 131 and a transmitter circuit 132.

The personal care device 200 here comprises a housing 201 having an outer housing surface 201O and disposed within the housing 201 a rechargeable energy source 250 and a therewith coupled energy receiver circuit 230 comprising a receiver coil 231 and a receiver circuit 232. It was already referred to document U.S. Pat. No. 10,218,212 B2 discussing one example of an inductive energy transfer arrangement.

In known wireless chargers, the charging circuit may be in a stand-by mode if it is not charging. The charger may in the stand-by regularly check whether an object, specifically a suitable device comprising an energy receiving circuit to charge a rechargeable energy source, is present on a charging region of the charger. The charger may also check whether such a device indeed requires charging prior to initiating a charging procedure. In order to not miss that a user has placed a device to be charged into the charging region, this check must be done relatively often, e.g., about every second. Such a charger may spend about 100 mW in such a stand-by mode, which would drain a typical internal energy source in a rather short time, which is too short for a sensible use of the charger over a longer period without a mains connection. E.g., the internal energy source might be depleted in a one-month period and no charging would be possible anymore.

To overcome such high energy consumption in the stand-by mode, the charger 100 in accordance with the present disclosure may have a stand-by mode in which the charging circuit 130 is completely switched off and potentially also the controller 120 is at least partly switched off so that the energy consumption of the charger in the stand-by mode is as low as possible. In accordance with the present disclosure, the motion sensor 110 provides a signal such as an interrupt to wake the sleeping controller 120, which itself may then activate the charging circuit 130.

While this low-energy consumption design is a beneficial option, a motion sensor 110 can also be used in a charger without such a low-energy consumption design. Further, even in a low-energy consumption set-up, the charger may still be designed to wake up on a regular or irregular basis to check for a device to be charged. Such wake-up may occur once a day or twice a day or three, four etc. times a day or every hour or every half hour or every quarter of an hour or every minute etc.

The basic idea of using a motion sensor 110 lies in the fact that even a careful user will typically cause some vibration or displacement of the charger 100 that can be measured by the motion sensor 110 when the user puts the personal care device 200 into the charging region 102.

The charger 100 may comprise a motion enhancer 140, 141, 142, 143, 144 to support an increase of the vibration amplitude and/or of the displacement caused by the placement of the personal care device 200 into the charging region 102. From a system point of view, the personal care device 200 may alternatively or additionally comprise a motion enhancer 240, 241, 242, preferably where the motion enhancer of the charger and the motion enhancer of the personal care device synergistically cooperate together to enhance the size or amplitude or temporal length or frequency of the vibration(s) and/or displacement(s) caused on the charger as a result of the placement of the personal care device into the charging region of the charger.

In FIG. 2, a variety of motion enhancers are shown at the charger 100 and at the personal care device 200 but it shall of course be understood that only one motion enhancer may be realized or two synergistically cooperating motion enhancers or a plurality of motion enhancers may be provided at the charger and/or the personal care device.

The charger 100 may comprise a permanent magnet 140, e.g., a disk-shaped magnet that may be made from neodymium—NdFeB—material, which magnet 140 is intended to cooperate with a permanent magnet or magnetizable element 140 in the personal care device so that in the placement procedure the magnetic interaction between the magnet 140 and the magnet or magnetizable element 240 causes vibration(s) or displacement(s) of the charger 100, specifically a lift-off of the charger 100 from the ground and potentially even a snapping-on action of the charger 100 onto the personal care device 200. From a system point of view, the personal care device 200 may comprise a magnet 240 and the charger 100 a magnetizable element 140.

The charger 100 may comprise a non-planar housing structure 141 in the charging region 102, e.g., the housing 101 of the charger 100 may comprise a projection or a recess in the charging region 102, specifically where the non-planar housing structure 141 is intended to cooperate with a non-planar housing structure 241 or 242 of the personal care device 200 to cause vibration(s) and/or displacement(s) of the charger 100 during the placement process. In the shown example, the non-planar housing structure 141 of the charger 100 is a dome-shaped projection that is intended to cooperate with a non-planar housing structure 241 of the personal care device 200, where the two non-planar housing structures 141 and 241 are shaped so that they fit to each other like a convex shape and a fitting concave shape.

The non-planar housing structures 141 and 241 may preferably also be used to align the transmitter coil 131 and the receiver coil 231 so that the coils 131 and 231 are optimally disposed for wireless charging. In the shown example, the non-planar housing structure 241 of the personal care device 240 comprises additional smaller non-planar housing structures 242, here small nubs or pimples, which are intended to cause vibration(s) and/or displacement (s) of the charger 100 in the placement process.

From a system point of view, the non-planar housing structure on either the charger 100 or the personal care device 200 may be realized by one or a plurality of non-planar housing structures 141 or 241 and additionally one or more of these non-planar housing structures 141 or 241 may comprise a non-planar sub-structure 242. In a not shown example, also the charger 100 comprises a non-planar sub-structure such as nubs or pimples or rings etc. so that in the placement some bumping between the personal care device 200 and of the charger 100 is caused.

The charger 100 may comprise a surface property 142 in the charging region 102 that supports a stick-slip effect. E.g., the charger 100 may comprise a coating from a rubber-like material to realize such a surface property 142. From a system point of view, the charger 100 and the personal care device 200 may each comprise surface properties in the charging region 102 and in the respective cooperating region of the personal care device 200 that together support a stick-slip effect.

The charger 100 may comprise a foot or feet 143 with which the charger 100 stands on the ground, which foot or feet 143 is/are made from a compressible and/or elastic material such as a foam rubber or a soft silicone so that a displacement and/or vibration of the charger 100 in the direction towards the ground is enabled. The weight of the personal care device 200 and/or the force with which a user pushes the personal care device 200 into the charging region 102 of the charger 100 may then cause vibration(s) and/or displacement(s). Alternatively or additionally, a housing portion 103 realizing the charging region 102 may be connected with a remaining housing portion 104 of the charger by means of a compressible and/or elastic material so that at least a vibration and/or displacement of the housing portion 103 realizing the charging region 102 relative to the remaining housing portion 104 is enabled.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A charger for charging a rechargeable energy source of a personal care device, the charger comprising:
    a charger housing having a charging region for positioning the personal care device;
    a charging circuit for performing a charging procedure of the rechargeable energy source of the personal care device;
    a motion sensor for detecting a motion of at least a portion of the charger;
    motion enhancer comprising a magnet or a magnetizable element disposed in or in close proximity to at least one of the charging region, a non-planar housing structure in the charging region, at least one compressible or an elastic element on the charger base, and at least a portion of the outer charger surface in the charging region having a first surface property that supports a stick-slip effect; and
    a controller coupled with the charging circuit and the motion sensor;
    wherein the controller is arranged to activate the charging circuit when the controller receives a motion signal from the motion sensor indicating a placement of the personal care device in the charging region and/or to deactivate the charging circuit when the controller receives a motion signal from the motion sensor indicating a removal of the personal care device from the charging region.

2. The charger of claim 1, wherein the charging circuit is arranged to check after activation by the controller the presence of a rechargeable energy source that requires charging prior to performing the charging procedure.

3. The charger of claim 1, wherein the controller is arranged to switch the charging circuit into a deactivated mode in which the charging circuit does not consume any energy in case the rechargeable energy source is completely charged or in case the personal care device is removed from the charging region, and wherein at least a part of the controller is then switched into a sleep mode.

4. The charger of claim 1, wherein the motion sensor is realized as an accelerometer and/or as a gyroscope.

5. The charger of claim 1, wherein the controller is arranged to compare the motion signal from the motion sensor with at least one threshold value and to activate the charging circuit only if the motion signal rises above the threshold level.

6. The charger of claim 1, wherein the controller is arranged to compare a time sequence of the motion signal with a predetermined motion signal time sequence and to activate the charging circuit only if a similarity measure determined by the comparison is above a threshold value.

7. The charger of claim 1, wherein the controller is arranged to automatically activate the charging circuit in a regular or irregular pattern independent from the motion signal.

8. The charger of claim 1, wherein the charging circuit is arranged for wireless charging of the rechargeable energy source.

9. The charger of claim 1, comprising an energy source comprising a rechargeable battery to provide energy to the charging circuit.

10. A system comprising a charger of claim 1 and a personal care device having a rechargeable energy storage arranged for being chargeable by the charger when the personal hygiene device is positioned in the charging region of the charger.

11. The system of claim 10, wherein the charger has a non-planar housing structure in the charging region, and the personal care device has a housing structure structured and configured for mechanical engagement with the non-planar housing structure of the charger when the personal care device is being positioned in the charging region, wherein the mechanically engaging housing structures enforce an alignment of a transmitter coil of the charger with a receiver coil of the personal care device.

12. The system of claim 10, wherein at least one of the charger and the personal care device comprises a magnet and the other one of the charger and the personal care device comprises a magnet or a magnetizable element that are arranged so that when the personal care device is being placed in its charging position on the charger, a magnetic force between the charger and the personal care device leads to a motion of at least a portion of the charger that is measurable with the motion sensor.

13. The system of claim 10, wherein at least a portion of the outer surface of the charger in the charging region has a first surface property and at least a portion of the outer surface of the personal care device intended for contacting the portion of the outer surface of the charger in the charging region having the first surface property during a positioning of the personal care device in the charging region of the charger has a second surface property, wherein the first surface property and the second surface property are chosen to support a stick-slip effect.

14. The charger of claim 1, wherein the controller automatically switches the charging circuit into a stand-by mode or activates the charging circuit, wherein the energy consumption of the charger in the stand-by mode is less than about 5 mW, wherein the charger comprises an internal energy source for providing the energy for at least one charging procedure and wherein the motion sensor is coupled with the controller and arranged to activate the charging circuit based on a signal provided by the motion sensor to the controller.

15. The charger of claim 1, wherein the motion enhancer is disposed between a top portion of the charger comprising the charging region and a base portion.

16. The charger of claim 4, wherein the motion sensor is realized as a micro-electric-mechanical system (MEMS) accelerometer and/or as a MEMS gyroscope having more than one axis, and wherein the motion sensor is realized as a mechanical vibration switch.

17. The charger of claim 16, wherein the motion sensor is realized as a mechanical omni-directional vibration switch, wherein the controller is arranged to monitor changes in a closed state or an open state of the vibration switch.

18. The charger of claim 14, wherein the energy consumption of the charger in the stand-by mode is less than about 2 mW.

19. The charger of claim 18, wherein the energy consumption of the charger in the stand-by mode is less than about 1 mW.

20. The charger of claim 19, wherein the energy consumption of the charger in the stand-by mode is less than about 0.5 W.

21. The charger of claim 20, wherein the energy consumption of the charger in the stand-by mode is less than about 0.2 mW.

22. The charger of claim 21, wherein the energy consumption of the charger in the stand-by mode is less than about 0.1 mW.

* * * * *